US010712100B2

(12) United States Patent
Adamson et al.

(10) Patent No.: US 10,712,100 B2
(45) Date of Patent: Jul. 14, 2020

(54) TWO-PHASE THERMAL LOOP WITH MEMBRANE SEPARATION

(71) Applicant: HAMILTON SUNDSTRAND CORPORATION, Charlotte, NC (US)

(72) Inventors: Gary A. Adamson, North Granby, CT (US); Wei-Lin Cho, Unionville, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 152 days.

(21) Appl. No.: 16/124,438

(22) Filed: Sep. 7, 2018

(65) Prior Publication Data

US 2019/0003777 A1    Jan. 3, 2019

Related U.S. Application Data

(62) Division of application No. 15/429,789, filed on Feb. 10, 2017, now Pat. No. 10,119,767.

(51) Int. Cl.

| | |
|---|---|
| *F28D 15/06* | (2006.01) |
| *B01D 19/00* | (2006.01) |
| *F28F 27/00* | (2006.01) |
| *F28D 15/02* | (2006.01) |

(Continued)

(52) U.S. Cl.
CPC ......... *F28D 15/06* (2013.01); *B01D 19/0031* (2013.01); *F28D 15/025* (2013.01); *F28D 15/0258* (2013.01); *F28D 15/0266* (2013.01); *F28D 15/04* (2013.01); *F28F 27/00* (2013.01); *F28F 27/02* (2013.01); *B01D 2311/2673* (2013.01)

(58) Field of Classification Search
CPC ...... F28D 15/06; F28D 15/04; F28D 15/0266; F28D 15/025; F28F 27/00; F28F 27/02; B01D 19/0031
See application file for complete search history.

(56) References Cited

U.S. PATENT DOCUMENTS

| | | | |
|---|---|---|---|
| 3,105,365 A * | 10/1963 | Harris et al. | ............ F25B 13/00 62/159 |
| 4,470,759 A | 9/1984 | Kosson | |
| 4,750,543 A | 6/1988 | Edelstein | |

(Continued)

FOREIGN PATENT DOCUMENTS

EP    1650509    4/2006

OTHER PUBLICATIONS

USPTO, Supplemental Notice of Allowability dated Oct. 1, 2018 in U.S. Appl. No. 15/429,789.

(Continued)

*Primary Examiner* — Ana M Vazquez
(74) *Attorney, Agent, or Firm* — Snell & Wilmer L.L.P.

(57) ABSTRACT

A thermal management loop system may include an accumulator, an evaporator in fluid receiving communication with the accumulator, a condenser in fluid receiving communication with the evaporator, and a membrane separator in fluid receiving communication with the condenser. Gas exiting the membrane separator may recirculate back to the condenser and liquid exiting the membrane separator may flow to the accumulator. The thermal management loop system may be a dual-mode system and thus may be operable in a powered-pump mode or a passive-capillary mode.

13 Claims, 5 Drawing Sheets

(51) Int. Cl.
*F28D 15/04* (2006.01)
*F28F 27/02* (2006.01)

(56) References Cited

U.S. PATENT DOCUMENTS

| | | | |
|---|---|---|---|
| 5,044,166 A * | 9/1991 | Wijmans | B01D 53/22 |
| | | | 62/475 |
| 5,103,897 A * | 4/1992 | Cullimore | F28D 15/043 |
| | | | 165/104.26 |
| 5,333,677 A | 8/1994 | Molivadas | |
| 5,454,777 A * | 10/1995 | Ziems | B04B 11/043 |
| | | | 210/147 |
| 6,533,029 B1 | 3/2003 | Phillips | |
| 6,615,912 B2 | 9/2003 | Garner | |
| 6,626,231 B2 | 9/2003 | Cluzet et al. | |
| 6,840,304 B1 | 1/2005 | Kobayashi et al. | |
| 6,948,556 B1 * | 9/2005 | Anderson | F28D 15/0266 |
| | | | 165/104.26 |
| 7,334,630 B2 | 2/2008 | Goodson | |
| 7,661,464 B2 | 2/2010 | Khrustalev et al. | |
| 7,770,630 B2 | 8/2010 | Chesser et al. | |
| 8,141,620 B1 | 3/2012 | Zrodnikov | |
| 8,596,341 B2 | 12/2013 | Tegrotenhuis et al. | |
| 8,696,794 B2 | 4/2014 | Paragano et al. | |
| 8,752,616 B2 | 6/2014 | Kroliczek et al. | |
| 9,046,288 B2 | 6/2015 | Cho | |
| 9,146,059 B2 | 9/2015 | Hoang | |
| 9,273,887 B2 | 3/2016 | Kroliczek et al. | |
| 9,854,715 B2 * | 12/2017 | Shedd | H05K 7/20818 |
| 2009/0133768 A1 * | 5/2009 | Miyake | F15B 1/103 |
| | | | 138/30 |
| 2009/0229283 A1 | 9/2009 | Marsala | |
| 2012/0017625 A1 | 1/2012 | Kroliczek | |
| 2013/0206658 A1 | 8/2013 | Wu et al. | |
| 2014/0246095 A1 | 9/2014 | Ellis | |
| 2015/0114607 A1 | 4/2015 | Moscatelli | |
| 2015/0338171 A1 | 11/2015 | Torres Sep Iveda et al. | |
| 2016/0047605 A1 | 2/2016 | Mishkinis et al. | |
| 2016/0109160 A1 * | 4/2016 | Junge | F25B 13/00 |
| | | | 62/324.6 |
| 2016/0366789 A1 | 12/2016 | Chainer et al. | |

OTHER PUBLICATIONS

European Patent Office, European Search Report dated Oct. 22, 2018 in Application No. 18154697.9.
US 8,381,805, 02/2013 (withdrawn)
USPTO, Election/Restriction Requirement dated Mar. 5, 2018 in U.S. Appl. No. 15/429,789.
USPTO, Pre-Interview First Office Action dated May 23, 2018 in U.S. Appl. No. 15/429,789.
European Patent Office, European Partial Search Report dated Jun. 27, 2018 in Application No. 18154697.9-1104.
USPTO, Notice of Allowance dated Aug. 7, 2018 in U.S. Appl. No. 15/429,789.

* cited by examiner

TWO-PHASE THERMAL LOOP WITH MEMBRANE SEPARATION

CROSS REFERENCE TO RELATED APPLICATIONS

This application is a divisional of, claims priority to and the benefit of, U.S. Ser. No. 15/429,789, filed Feb. 10, 2017, and entitled "TWO-PHASE THERMAL LOOP WITH MEMBRANE SEPARATION," which is incorporated by reference herein in its entirety for all purposes.

FIELD

The present disclosure relates to thermal management systems and, more specifically, to two-phase thermal management systems.

BACKGROUND

Heat exchangers are used in a variety of thermal management systems. Single phase liquid heat exchangers, for example, are often used to cool and/or heat components of a system. In such heat exchangers, a liquid is pumped across a component and sensible heat is transferred between the liquid and the component and thus the liquid changes temperature. These heat exchangers rely on the sensible heat capacity of the liquid to transfer heat. However, these single phase heat exchangers often utilize large volumes of liquid, which can increase the overall operating costs of a thermal management system.

SUMMARY

In various embodiments, the present disclosure provides a thermal management loop system. The thermal management loop system includes an accumulator, an evaporator in fluid receiving communication with the accumulator, a condenser in fluid receiving communication with the evaporator, and a membrane separator in fluid receiving communication with the condenser. The membrane separator may be configured to recirculate gas to the condenser and to provide liquid to the accumulator.

In various embodiments, the membrane separator is coupled to a liquid inlet of the accumulator. According to various embodiments, the thermal management loop system further includes a flow sensor coupled to the membrane separator, wherein identifying a heat transfer load on the thermal management loop system is based on flow data received from the flow sensor. In various embodiments, the thermal management loop system further includes a pump that drives fluid circulation, wherein the pump pumps liquid from the accumulator to the evaporator. The thermal management loop system may further include a valve in fluid communication between the evaporator and the accumulator, wherein liquid exiting the evaporator flows through the valve to the accumulator. The valve may include a back pressure valve that controls back pressure in the evaporator. The valve may control flow of gas from the evaporator.

In various embodiments, the pump is a variable speed pump. In various embodiments, the variable speed pump is a first variable speed pump and the thermal management loop system further includes a second variable speed pump arranged in parallel with the first variable speed pump. In various embodiments, the evaporator is a porous media evaporator. Capillary pressure in the porous media evaporator may drive fluid circulation. In various embodiments, all liquid entering the evaporator evaporates to gas. In various embodiments, the accumulator is a bellows accumulator, such as a metal bellows accumulator.

Also disclosed herein, according to various embodiments, is a dual-mode thermal management loop system configured to operate in either a powered-pump mode or a passive-capillary mode. The dual-mode thermal management loop system may include a controller and a tangible, non-transitory memory. The controller may include a processor and the memory may be configured to communicate with the processor. The tangible, non-transitory memory may have instructions stored thereon that, in response to execution by the processor, cause the dual-mode thermal management loop system to perform various operations. The various operations include, according to various embodiments, identifying, by the processor, a heat transfer load on the dual-mode thermal management loop system and determining, by the processor, whether the heat transfer load exceeds a predetermined threshold. The various operations may further include, in response to determining that the heat transfer load does not exceed the predetermined threshold, operating, by the processor, the dual-mode thermal management loop system in the passive-capillary mode. The various operations may further include, in response to determining that the heat transfer load exceeds the predetermined threshold, operating, by the processor, the dual-mode thermal management loop system in the powered-pump mode.

In various embodiments, identifying the heat transfer load includes detecting a flow of fluid in a membrane separator that is fluidly coupled between a condenser and an accumulator. In various embodiments, identifying the heat transfer load includes detecting a location of a liquid-vapor interface of an evaporator. In various embodiments, operating the dual-mode thermal management loop system in the passive-capillary mode includes transmitting a first valve command to a first valve to prevent fluid circulation through a pump. In various embodiments, operating the dual-mode thermal management loop system in the powered-pump mode includes transmitting a first valve command to a first valve to prevent fluid circulation through a pump bypass line.

Also disclosed herein, according to various embodiments, is a method of controlling a dual-mode thermal management loop system. The method includes identifying, by a controller, a heat transfer load on the dual-mode thermal management loop system and determining, by the controller, whether the heat transfer load exceeds a predetermined threshold. The method further includes, in response to determining that the heat transfer load does not exceed the predetermined threshold, operating, by the controller, the dual-mode thermal management loop system in a passive-capillary mode. The method further includes, in response to determining that the heat transfer load exceeds the predetermined threshold, operating, by the controller, the dual-mode thermal management loop system in a powered-pump mode. In various embodiments, identifying the heat transfer load includes detecting a flow of fluid in a membrane separator that is fluidly coupled between a condenser and an accumulator.

The forgoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation. Throughout the present disclosure, like reference numbers denote like elements.

Disclosed herein, according to various embodiments, is a thermal management loop system. The thermal management loop system generally includes a phase transition heat exchanger configuration. As described in greater detail below, and according to various embodiments, the thermal management loop system generally includes a membrane separator that is configured to separate gas from liquid. The membrane separator can be implemented in a powered-pump thermal management loop system a passive-capillary thermal management loop system, or a dual-mode thermal management loop system, as described below. That is, the membrane separator may be utilized in a system architecture that can toggle between operating modes in order to improve operating efficiency, account for pump failure, and manage varying (or variable) heat loads.

The thermal management loop system generally includes, according to various embodiments, an accumulator, an evaporator in fluid receiving communication with the accumulator, a condenser in fluid receiving communication with the evaporator, and a membrane separator in fluid receiving communication with the condenser. The gas exiting the membrane separator can recirculate back to the condenser and liquid exiting the membrane separator can flow to the accumulator, according to various embodiments.

Figure 1:
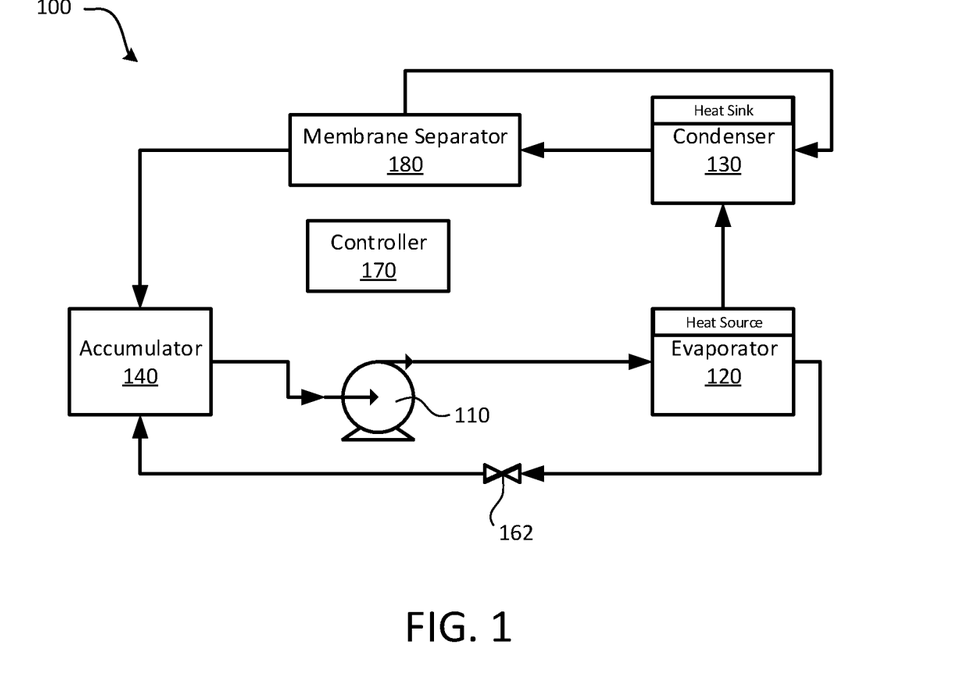
FIG. 1 illustrates a schematic block diagram of a thermal management loop system, in accordance with various embodiments.

In various embodiments, and with reference to FIG. 1, the thermal management loop system 100 has a powered-pump configuration in which a pump 110 drives fluid circulation. In the powered-pump configuration, the pump 110 pumps liquid from the accumulator 140 to the evaporator 120. The evaporator 120 is in heat receiving communication with a heat source such that at least a portion of the liquid pumped into the evaporator 120 evaporates into a gas. Liquid that is not evaporated in the evaporator 120 flows through a valve 162 and back to the accumulator whereas gas exiting the evaporator 120 flows to a condenser 130 where heat is rejected to condense the gas to a liquid. The membrane separator 180 is downstream of the condenser 130 and is configured to separate gas-phase fluid from liquid-phase fluid. That is, according to various embodiments, the membrane separator 180 is configured to recirculate uncondensed gas back to the condenser 130 and deliver condensate (i.e., liquid) to the accumulator 140. The thermal management loop system 100 may also include a controller 170, as described in greater detail below. Additional details pertaining to the thermal management loop system 100 with a powered-pump configuration are included below with reference to the powered-pump mode 300B of FIG. 3B.

The membrane separator 180 disclosed herein, according to various embodiments, is coupled to a liquid inlet of the accumulator 140. That is, while the membrane separator 180 may be a standalone component, in various embodiments the membrane separator 180 may be coupled to or may be a component of the accumulator 140. A flow sensor may be coupled to the membrane separator 180 and may be configured to report flow data (e.g., flow information pertaining to the condensate/liquid flow or flow information pertaining to the separated, recirculated gas flow, such as mass flow rate, pressure, and the like) to the controller 170. In various embodiments, as described below with reference to FIG. 5, identifying a heat transfer load on the thermal management loop system is based on the flow data received from the flow sensor. In various embodiments, the accumulator 140 is a bellows accumulator (e.g., a metal bellows accumulator) that accounts for fluid volumetric expansion in the system and facilitates system pressure control.

Figure 2:
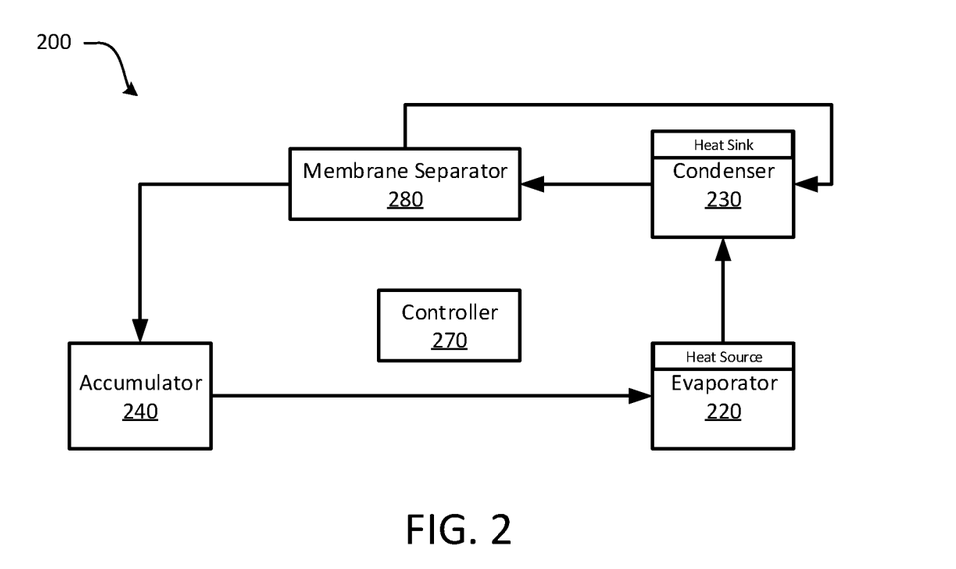
FIG. 2 illustrates a schematic block diagram of a thermal management loop system, in accordance with various embodiments.

In various embodiments, and with reference to FIG. 2, the thermal management loop system 200 has a passive-capillary configuration in which capillary pressure drives fluid circulation. In the passive-capillary configuration, capillary pressure in the evaporator 220 (e.g., a porous media evaporator) draws liquid from the accumulator 240 to the evaporator 220. The evaporator 220 is in heat receiving communication with a heat source such that the liquid drawn into the evaporator 220 evaporates into a gas. The gas exiting the evaporator 220 flows to a condenser 230 where heat is rejected to condense the gas back to a liquid. The membrane separator 280 is downstream of the condenser 230 and is configured to separate gas-phase fluid from liquid-phase fluid. That is, according to various embodiments, the membrane separator 280 is configured to recirculate any uncondensed gas back to the condenser 230 and deliver condensed gas (i.e., liquid) to the accumulator 140. Additional details pertaining to this passive-capillary configuration are included below with reference to the passive-capillary mode 300C and FIG. 3C.

Figure 3A:
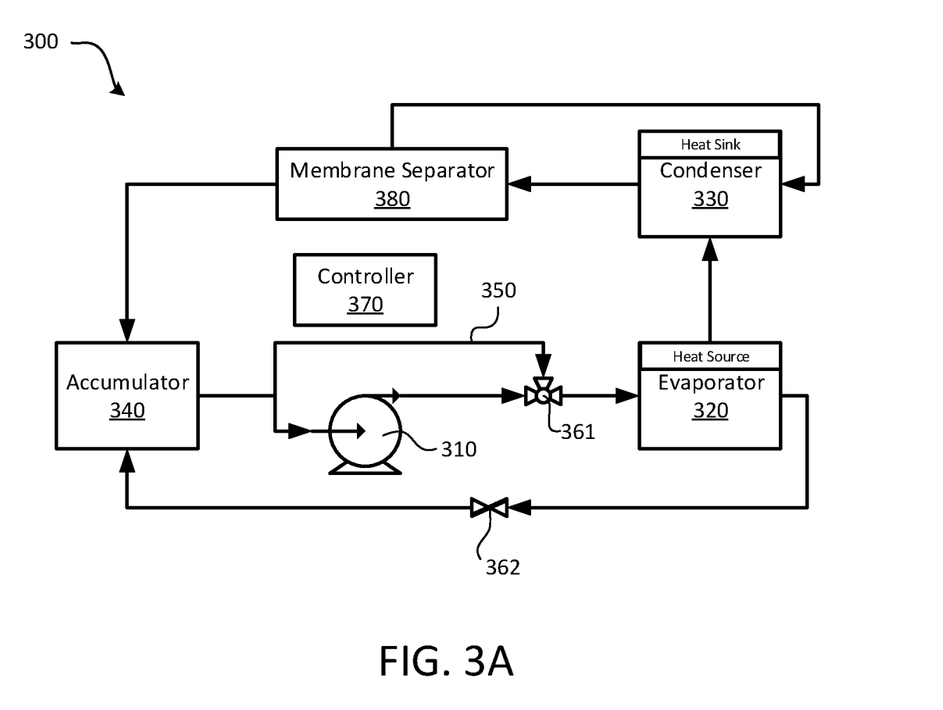
FIG. 3A illustrates a schematic block diagram of a dual-mode thermal management loop system, in accordance with various embodiments.

In various embodiments, and with reference to FIG. 3A, the thermal management loop system is a dual-mode thermal management loop system 300. The dual-mode thermal management loop system 300 includes a pump 310, an evaporator 320, a condenser 330, a membrane separator 380, an accumulator 340, a pump bypass line 350, a first valve 361, and a second valve 362, according to various embodiments. The evaporator 320 may be in selective fluid receiving communication with the pump 310 and in selective fluid receiving communication with the pump bypass line 350. The condenser 330 may be in fluid receiving communication with the evaporator 320. The membrane separator 380 may be in fluid receiving communication with the condenser 330. The accumulator 340 may be in fluid receiving communication with the membrane separator 380 and the evaporator 320. The pump bypass line 350 may be in fluid communication with the accumulator 340. The first valve 361 may be in fluid communication with the evaporator 320. The second valve 362 may be in fluid communication with the evaporator 320.

The evaporator 320 is downstream of the pump 310 and the pump bypass line 350, according to various embodiments. An outlet of the pump 310 and the pump bypass line 350 may be coupled to the first valve 361. The first valve 361 generally controls whether the evaporator 320 is supplied with liquid from the pump 310 or liquid from the pump bypass line 350, as described in greater detail below. In various embodiments, the evaporator 320 is in heat receiving communication with a heat source. Heat from the heat source is transferred to the liquid flowing through the evaporator 320. Both latent heat transfer and sensible heat transfer may occur in the evaporator 320, with evaporated gas flowing out of the evaporator 320 via a gas outlet towards the condenser 330 and any non-evaporated, surplus liquid flowing to the accumulator 340. The condenser 330 may be in heat rejecting thermal communication with a heat sink and may be configured to condense the gas into a liquid. The membrane separator 380, according to various embodiments, is downstream of the condenser 330 and may be configured to separate uncondensed gas from the condensate liquid. The uncondensed gas is recirculated to the condenser 330 while the condensate/liquid flows into the accumulator 340, according to various embodiments. Therefore, in the powered-pump mode 300B (see below with reference to FIG. 3B) the membrane separator 380 may prevent cavitation in the pump 310.

The dual-mode thermal management loop system 300 may further include a controller 370, as described in greater detail below, that is configured to control the various components of the system 300. Generally, the dual-mode thermal management loop system 300 is configured to operate in either a powered-pump mode 300B (FIG. 3B) or in a passive-capillary mode 300C (FIG. 3C).

Figure 3B:
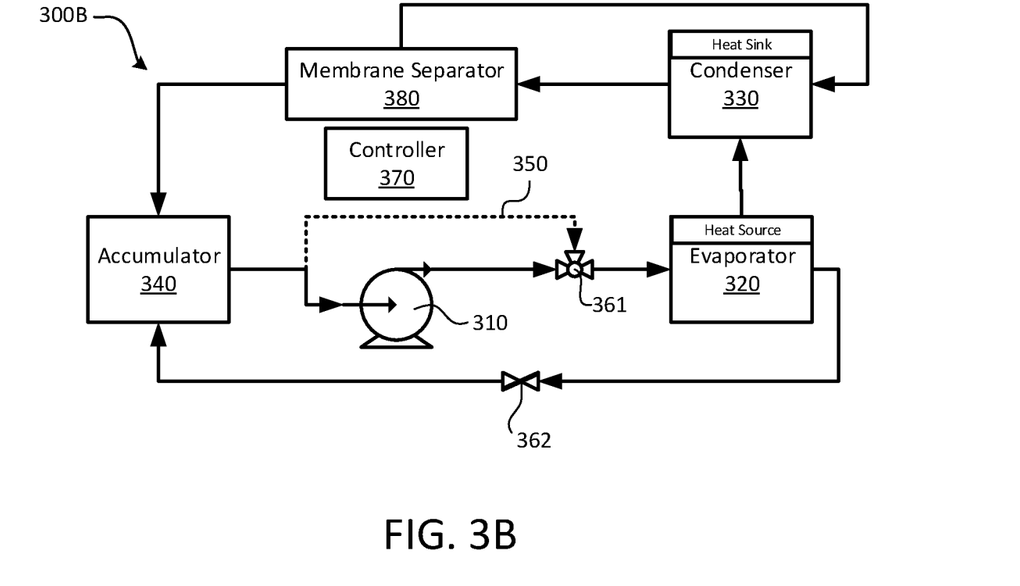
FIG. 3B illustrates a schematic block diagram of the dual-mode thermal management loop system of FIG. 3A operating in a powered-pump mode, in accordance with various embodiments.

In various embodiments, and with reference to FIG. 3B, the dual-mode thermal management loop system 300 is shown in the powered-pump mode 300B. In the powered-pump mode 300B, according to various embodiments, the pump 310 drives fluid circulation and the first valve 361 is arranged to prevent fluid circulation through the pump bypass line 350 (dashed lines throughout the figures refer to the portions—e.g., tubes, pipes, channels, lines, etc.—of the system 300 that do not have fluid circulating there through). In the powered-pump mode 300B, the pump 310 is configured to pump liquid from the accumulator 340 to the evaporator 320. Gas exiting the evaporator 320 (i.e., gas generated via evaporation) flows to the condenser 330 while surplus liquid exiting the evaporator 320 flows through the second valve 362, which remains at least partially open, to the accumulator 340 for recirculation.

Figure 3C:
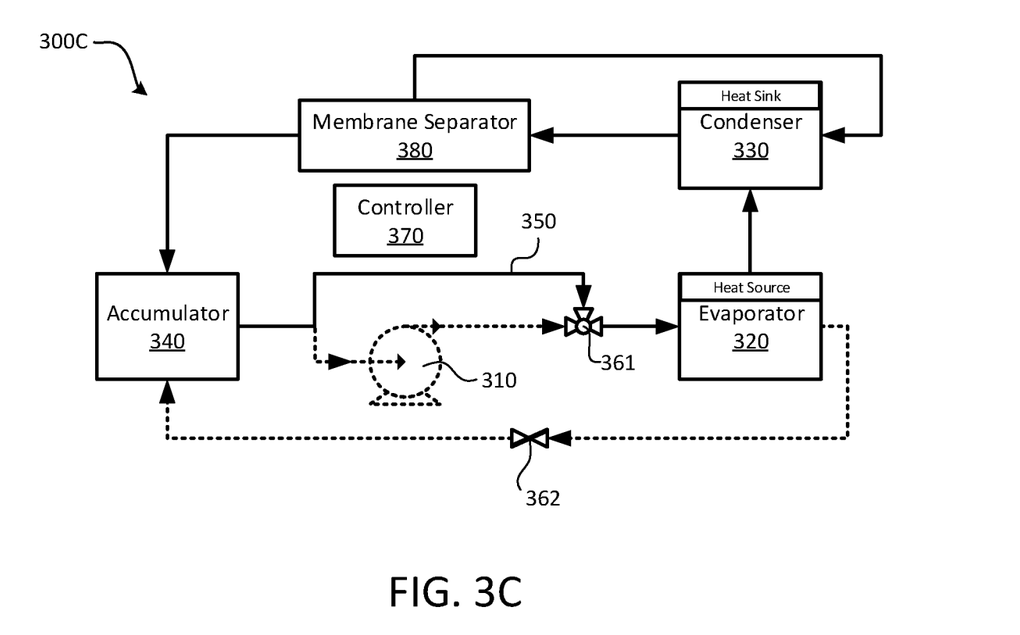
FIG. 3C illustrates a schematic block diagram of the dual-mode thermal management loop system of FIG. 3A operating in a passive-capillary mode, in accordance with various embodiments.

In various embodiments, and with reference to FIG. 3C, the dual-mode thermal management loop system 300 is shown in the passive-capillary mode 300C. In the passive-capillary mode 300C, according to various embodiments, capillary pressure (described in greater detail below) in the evaporator 320 drives fluid circulation and the first valve 361 prevents fluid circulation through the pump 310. Additionally, the second valve 362 is closed, according to various embodiments, and thus no surplus liquid flows out the evaporator 320. In the passive-capillary mode 300C, liquid flows from the accumulator 340 to the evaporator 320 via the pump bypass line 350. Gas exiting the evaporator 320 flows to the condenser 330 and fluid flowing from the condenser 330 flows into the membrane separator 380. Uncondensed gas is separated from liquid by the membrane separator 380 and the separated gas is recirculated to the condenser 330 while the condensate flows to the accumulator 340, according to various embodiments. As mentioned above, the evaporator 320 does not have surplus liquid exiting and thus the exclusive outlet of the evaporator 320 in the passive-capillary mode 300C is a gas outlet that flows into the condenser 330. Said differently, in the passive-capillary mode 300C, according to various embodiments, all the liquid entering the evaporator evaporates to gas.

The capillary pressure, according to various embodiments, is based on the surface tension of the liquid and the pore size of the features in the evaporator 320. In various embodiments, the evaporator 320 is a porous media evaporator that utilizes a porous media to separate the liquid from the gas during evaporation. The porous media of the evaporator 320 may be positioned within a housing and the porous media may form a conduit. In various embodiments, fluidic communication between the conduit formed by the porous media and a gas outlet is through a porous wall of the porous media. In other words, and according to various embodiments, fluid communication between the conduit and the gas outlet is limited/restricted to the pores of the porous wall that form the conduit of the porous media. In various embodiments, the average pore size (e.g., diameter) of the porous media is between about 0.1 micrometers and about 20 micrometers. In various embodiments, the average pore size of the porous media is between about 0.5 micrometers and about 10 micrometers. In various embodiments, the average pore size of the porous media is between about 1 micrometer and about 5 micrometers. As used in this context, the term about means plus or minus 0.1 micrometer. The size of the pores may be specifically configured for a specific application. For example, the size of the pores, together with the surface tension properties of the liquid, affect the capillary action of the pores and thus affect the overall fluid circulation rate and the heat transfer capacity of the system.

In operation, liquid enters the porous media conduit (whether by being pumped in or whether by being drawn in via capillary pressure) via a liquid inlet of the evaporator. As mentioned above, the evaporator may be in heat receiving communication with a heat source. In response to the heat transferring into the evaporator from the heat source, the liquid flowing through the porous media conduit may receive latent heat and at least a portion of the liquid undergoes a phase change (e.g., evaporates).

The porous media may be made from various materials, such as ceramic materials, metallic materials, composite materials, etc. For example, the porous media may be constructed from a monolithic ceramic material and/or from a metallic screen mesh or a metallic felt-like material. The porous media may include multiple layers. In various embodiments, the porous media is disposed in direct physical contact with the housing of the evaporator 320 in order to promote efficient heat transfer between the housing and the porous media.

Figure 4:
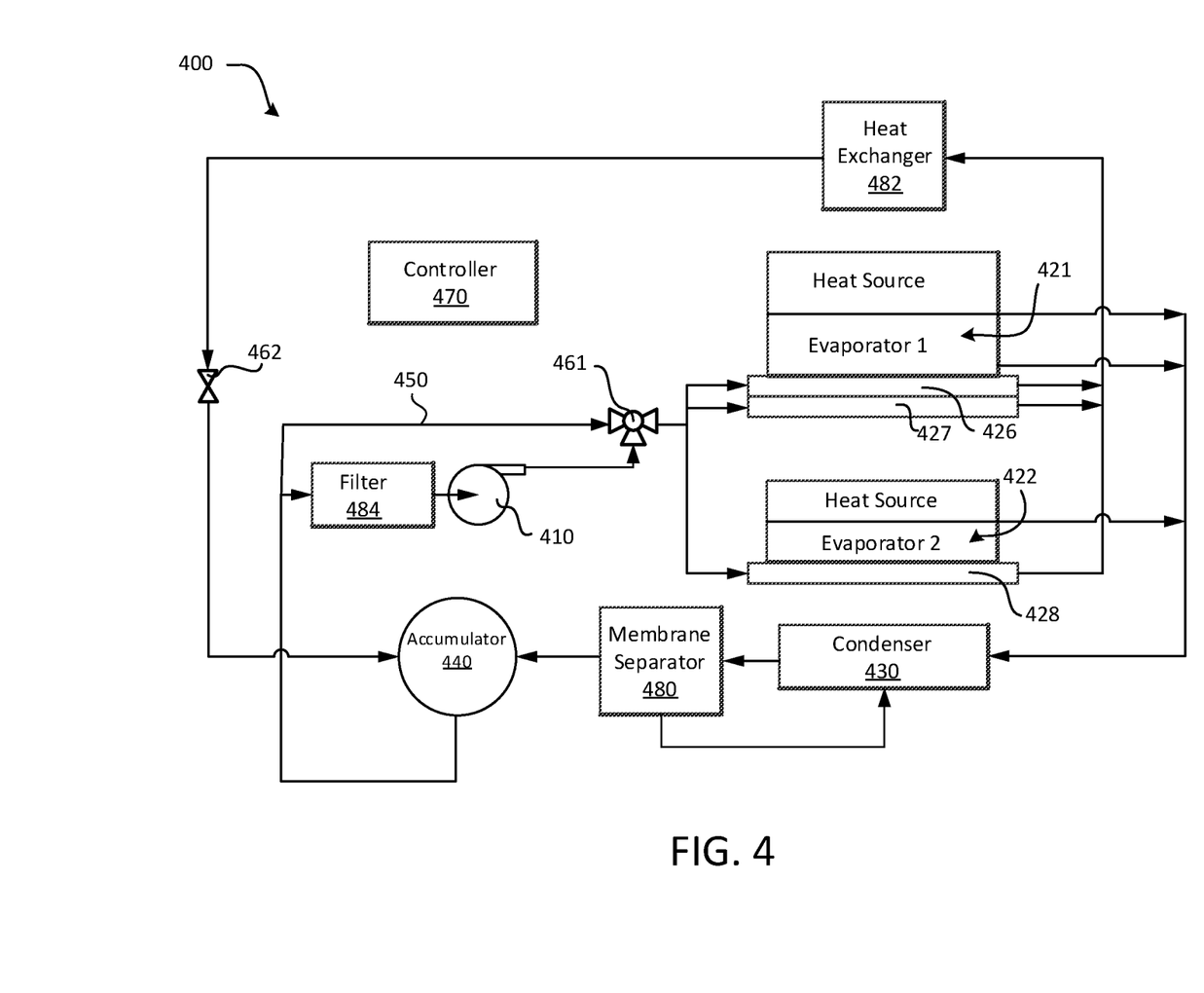
FIG. 4 illustrates a schematic block diagram of a dual-mode thermal management loop system, in accordance with various embodiments.

In various embodiments, and with reference to FIG. 4, the dual-mode thermal management loop system 400 is provided. As mentioned previously, like reference numerals refer to like elements. Accordingly, pump 410 shown in FIG. 4 may be similar to pump 110 of FIG. 1, according to various embodiments. Thus, elements that have reference numbers that share the last two digits are like elements.

The dual-mode thermal management loop system 400 may include, with reference to FIG. 4, multiple evaporators 421, 422. The evaporators 421, 422 may be arranged in parallel. In various embodiments, the evaporators 421, 422 may include a porous media conduit 426, 427, 428. In various embodiments, one of the evaporators 421 may include multiple porous media conduits 426, 427 while another of the evaporators 422 may have a single porous media conduit 428. The dual-mode thermal management loop system 400 includes, according to various embodiments, a filter 484 disposed upstream of the pump 410 and a heat rejecting heat exchanger fluidly connected downstream of the surplus liquid exiting the evaporators 421, 422.

In various embodiments and in the powered-pump mode, the pump 410 drives fluid circulation and the first valve 461 is arranged to prevent fluid circulation through the pump bypass line 450. In the powered-pump mode, the pump 410 is configured to pump liquid from the accumulator 440 to the evaporators 421, 422. Gas exiting the evaporators 421, 422 (i.e., gas generated via evaporation) flows to the condenser 430 while surplus liquid exiting the evaporators 421, 422 flows through the second valve 462, which remains at least partially open, to the accumulator 440 for recirculation.

In various embodiments, the second valve 462, when the system 400 is in the powered-pump mode, functions as a back pressure valve that controls back pressure in the evaporators 421, 422. The second valve 462 may further be configured to control the flow of gas from the evaporator, due to the back pressure effect of the second valve 462 on the evaporators 421, 422.

In various embodiments and in the passive-capillary mode, capillary pressure in the evaporators 421, 422 drives fluid circulation and the first valve 461 prevents fluid circulation through the pump 410. Additionally, the second valve 462 is closed, according to various embodiments, and thus no surplus liquid flows out of the evaporators 421, 422. In the passive-capillary mode, liquid flows from the accumulator 440 to the evaporators 421, 422 via the pump bypass line 450. Gas exiting the evaporators 421, 422 flows to the condenser 430 and fluid from the condenser 430 flows to the membrane separator 480. Uncondensed gas is separated from the condensate and is recirculated to the condenser 430 and the liquid condensate flows to the accumulator 440. As mentioned above, the evaporators 421, 422 do not have surplus liquid exiting and thus the exclusive outlet of the evaporators 421, 422 in the passive-capillary mode is a gas outlet that flows into the condenser 430. Said differently, in the passive-capillary mode, according to various embodiments, all the liquid entering the evaporator evaporates to gas.

As mentioned above, the dual-mode thermal management loop system 400 may include a controller 470 for controlling the various components, elements, and valves of the system 400. The dual-mode thermal management loop system 400 may include additional components, such as pressure, temperature, and/or flow sensors. Such sensors may be positioned at various locations throughout the system and may be in electronic communication with the controller 470. Additionally, the valves 461, 462 of the system 400 may be in electronic communication with the controller 470 and the controller 470 may be able to transmit commands to the valves 461, 462 and other components to actuate and control the dual-mode thermal management loop system 400. For example, the pump 410 may be a variable speed pump and the controller 470 may be configured to control the pump pressure. In various embodiments, the pump 410 may include multiple variable speed pumps (e.g., a first variable speed pump coupled in parallel with a second variable speed pump).

The controller 470, according to various embodiments, includes a processor. The processor(s) can be a general purpose processor, a digital signal processor (DSP), an application specific integrated circuit (ASIC), a field programmable gate array (FPGA) or other programmable logic device, discrete gate or transistor logic, discrete hardware components, or any combination thereof. In various embodiments, the processor can be configured to implement various logical operations in response to execution of instructions, for example, instructions stored on a non-transitory, tangible, computer-readable medium. As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

The processor of the controller 470 may execute various instructions stored on the tangible, non-transitory memory to cause the dual-mode thermal management loop system 400 to perform various operations. These operations include, according to various embodiments, identifying a heat transfer load on the dual-mode thermal management loop system 400. The operations may further include determining whether the identified heat transfer load exceeds a predetermined threshold. If it is determined that the heat transfer load does not exceed the predetermined threshold, the processor may operate the dual-mode thermal management loop system 400 in the passive-capillary mode. If it is determined that the heat transfer load exceeds the predetermined threshold, the processor may operate dual-mode thermal management loop system 400 in the powered-pump mode.

In various embodiments, the controller 470 may continue to monitor the heat transfer load so that the controller 470 can swap operation of the system 400 between the two modes as necessary. In various embodiments, the controller 470 may be configured to operate the system 400 in the passive-capillary mode if the pump 410 fails. Additionally, according to various embodiments, the controller 470 can have control over the heat sources themselves, thereby allowing the controller 470 to select the heat transfer load. In such embodiments, the controller 470 may be configured to directly change the operating mode of the system 400 based on the selected heat transfer load.

In various embodiments, identifying the heat transfer load includes detecting a temperature of a heat source that is in heat receiving communication with the evaporator(s) 421, 422. In various embodiments, identifying the heat transfer load includes detecting a location of a liquid-vapor interface of the evaporator(s) 421, 422. Said differently, the controller 470 may be configured to monitor the porous media 426, 427, 428 of the evaporators 421, 422 (through various pressure sensors/transducers) to determine if the amount of liquid in the porous media is reduced (i.e, "drying out") due to insufficient liquid flow. For example, the liquid-vapor interface may be pushed from a vapor side of the evaporator 421, 422 to a liquid side of the evaporator 421, 422, which may damage the porous media (e.g., may cause the porous media to "dry-out"). In such embodiments, the controller 470 may adjust the pump power and/or increase the liquid surplus back pressure via the second valve 462.

In various embodiments, operating the dual-mode thermal management loop system 400 in the passive-capillary mode includes transmitting a first valve command to the first valve 461 to prevent fluid circulation through the pump 410. In various embodiments, operating the dual-mode thermal management loop system 400 in the passive-capillary mode includes transmitting a second valve command to the second valve 462 to close. In various embodiments, operating the dual-mode thermal management loop system 400 in the powered-pump mode includes transmitting a pump command to the pump 410 and/or transmitting a first valve command to the first valve 461 to prevent fluid circulation through the pump bypass line 450. Operating in the powered-pump mode may further include transmitting a second valve command to the second valve 462 to control back pressure in the evaporator(s) 421, 422.

Figure 5:
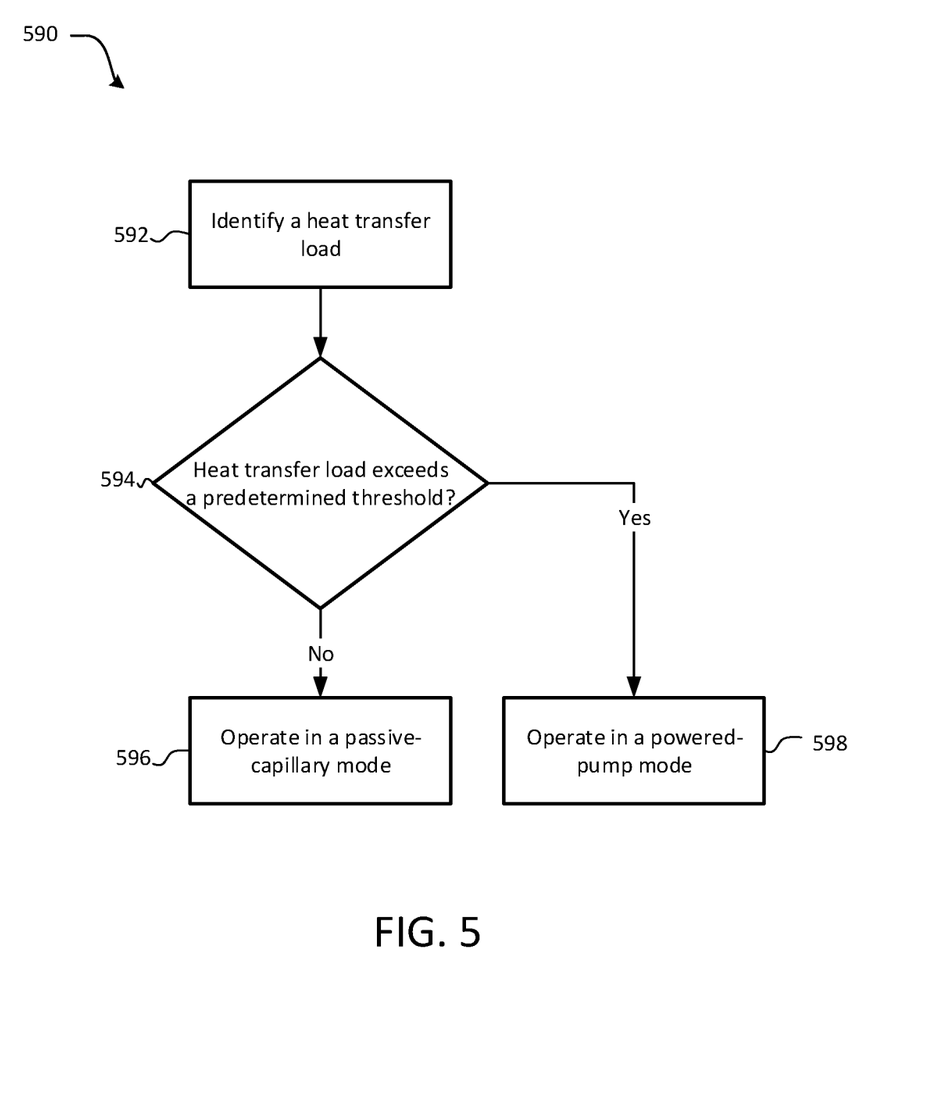
FIG. 5 illustrates a schematic flow chart diagram of a method of controlling a dual-mode thermal management loop system, in accordance with various embodiments.

In various embodiments, and with reference to FIG. 5, a method 590 of controlling a dual-mode thermal management loop system is provided. The method 590, according to various embodiments, includes identifying, by a controller, a heat transfer load at step 592 and determining, by a controller, whether the heat transfer load exceeds a predetermined threshold at step 594. In response to determining that the heat transfer load does not exceed the predetermined threshold, the method 590 may include operating, by the controller, the dual-mode thermal management loop system in a passive-capillary mode at step 596. In response to determining that the heat transfer load exceeds the predetermined threshold, the method 590 may include operating, by the controller, the dual-mode thermal management loop system in a powered-pump mode at step 598. In various embodiments, step 592 includes determining whether an evaporator is properly wetted (e.g., whether the evaporator has experienced "dry-out"). In various embodiments, identifying the heat transfer load (step 592) includes detecting a flow of fluid in a membrane separator that is fluidly coupled between a condenser and an accumulator.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A thermal management loop system comprising:
   an accumulator;
   an evaporator in fluid receiving communication with the accumulator;
   a condenser in fluid receiving communication with the evaporator;

a membrane separator in fluid receiving communication with the condenser, the membrane separator configured to recirculate gas to the condenser and to provide liquid to the accumulator; and a flow sensor coupled to the membrane separator, wherein identifying a heat transfer load on the thermal management loop system is based on flow data received from the flow sensor.

2. The thermal management loop system of claim 1, wherein the membrane separator is coupled to a liquid inlet of the accumulator.

3. The thermal management loop system of claim 1, further comprising a pump that drives fluid circulation, wherein the pump pumps liquid from the accumulator to the evaporator.

4. The thermal management loop system of claim 3, further comprising a valve in fluid communication between the evaporator and the accumulator, wherein liquid exiting the evaporator flows through the valve to the accumulator.

5. The thermal management loop system of claim 4, wherein the valve comprises a back pressure valve that controls back pressure in the evaporator.

6. The thermal management loop system of claim 4, wherein the valve controls flow of gas from the evaporator.

7. The thermal management loop system of claim 3, wherein the pump is a variable speed pump.

8. The thermal management loop system of claim 7, wherein the variable speed pump is a first variable speed pump, wherein the thermal management loop system further includes a second variable speed pump arranged in parallel with the first variable speed pump.

9. The thermal management loop system of claim 1, wherein the evaporator is a porous media evaporator.

10. The thermal management loop system of claim 9, wherein capillary pressure in the porous media evaporator drives fluid circulation.

11. The thermal management loop system of claim 10, wherein all liquid entering the evaporator evaporates to gas.

12. The thermal management loop system of claim 1, wherein the accumulator is a bellows accumulator.

13. A thermal management loop system configured to operate in either a powered-pump mode or a passive-capillary mode, the thermal management system comprising:

an accumulator;

a pump in fluid receiving communication with the accumulator;

a pump bypass line in fluid receiving communication with the accumulator;

an evaporator in selectable fluid receiving communication with the pump and the pump bypass line;

a condenser in fluid receiving communication with the evaporator; and a membrane separator in fluid receiving communication with the condenser, the membrane separator configured to recirculate gas to the condenser and to provide liquid to the accumulator;

wherein:

the evaporator is a porous media evaporator;

in the powered-pump mode the pump bypass line is closed and the pump drives fluid circulation through the thermal management loop system;

in the powered-pump mode a back pressure valve downstream of the evaporator is configured to control liquid back pressure in the evaporator;

in the passive-capillary mode fluid flow through the pump is closed and the pump bypass line is open; and in the passive-capillary mode capillary pressure in the evaporator drives fluid circulation through the thermal management loop system.

* * * * *